US006564309B1

(12) United States Patent
Fuin

(10) Patent No.: US 6,564,309 B1
(45) Date of Patent: May 13, 2003

(54) DSP ARCHITECTURE OPTIMIZED FOR MEMORY ACCESSES

(75) Inventor: Didier Fuin, Lumbin (FR)

(73) Assignee: STMicroelectronics S.A., Gentilly (FR)

(*) Notice: Subject to any disclaimer, the term of this patent is extended or adjusted under 35 U.S.C. 154(b) by 0 days.

(21) Appl. No.: 09/287,597

(22) Filed: Apr. 6, 1999

(30) Foreign Application Priority Data

Apr. 9, 1998 (FR) ............................................. 98 04710

(51) Int. Cl.$^7$ ................................................ G06F 12/00
(52) U.S. Cl. ........................ 711/168; 711/150; 711/120
(58) Field of Search ................. 711/167, 150, 711/168, 120, 123

(56) References Cited

U.S. PATENT DOCUMENTS

| 5,377,336 A | * | 12/1994 | Eickemeyer et al. | ........ | 711/213 |
| 5,500,950 A | * | 3/1996 | Becker et al. | ............... | 711/118 |
| 5,509,137 A | * | 4/1996 | Itomitsu et al. | .............. | 711/168 |
| 5,623,628 A | * | 4/1997 | Brayton et al. | ................ | 710/39 |
| 5,664,215 A | * | 9/1997 | Burgess et al. | ................ | 712/23 |
| 5,752,069 A | * | 5/1998 | Roberts et al. | ............... | 711/128 |
| 5,875,463 A | * | 2/1999 | Crump et al. | ................ | 711/123 |
| 5,966,514 A | * | 10/1999 | Matsuzaki et al. | ............. | 711/1 |

FOREIGN PATENT DOCUMENTS

EP       A-0 651 323         5/1995

OTHER PUBLICATIONS

French Search Report from French Patent Application 98 04710, filed Apr. 9, 1998.

* cited by examiner

*Primary Examiner*—Matthew Kim
*Assistant Examiner*—Matthew D. Anderson
(74) *Attorney, Agent, or Firm*—Wolf, Greenfield & Sacks, P.C.; James H. Morris; Gary S. Engelson

(57) ABSTRACT

The present invention relates to a processor including at least one memory access unit for presenting a read or write address over an address bus of a memory in response to the execution of a read or write instruction; and an arithmetic and logic unit operating in parallel with the memory access unit and arranged at least to present data on the data bus of the memory while the memory access unit presents a write address. The processor includes a write address queue in which is stored each write address provided by the memory access unit waiting for the availability of the data to be written.

20 Claims, 2 Drawing Sheets

DSP ARCHITECTURE OPTIMIZED FOR MEMORY ACCESSES

BACKGROUND OF THE INVENTION

1. Field of the Invention

The present invention relates to a digital signal processor (DSP), and more specifically to an architecture that avoids problems resulting from memory latency.

2. Discussion of the Related Art

FIG. 1 schematically and partially shows a conventional DSP architecture. The DSP includes four processing units operating in parallel. Two of these units are memory access units (MEMU) 10. An arithmetic and logic unit (ALU) 12 and a branch unit (BRU) 14 are further provided. Each of the MEMU units is associated with a memory 16 via an independent bus.

Branch unit BRU receives from an instruction memory, not shown, a compound instruction INST which can include four elementary instructions to be provided to each of the units in parallel. Unit BRU retrieves the instruction meant for it and distributes in parallel the three remaining instructions I1, I2, and I3 to the ALU and MEMU units.

Each of the ALU and MEMU units generally includes an instruction queue 18, in the form of a FIFO, in which the instructions wait before they are processed by the corresponding unit.

A DSP of the type of FIG. 1 is optimized to perform vectorial operations of the type X[i] OP Y[j], where i and j vary, generally in a loop, and where OP designates any operation to be performed by arithmetic unit 12. Indeed, operands X[i] and Y[j] can be fetched together via the two buses of memory 16 and processed, in theory, in the same cycle by ALU 12.

In practice, difficulties arise due to the structure of currently used memories, generally SRAMs. Although a memory access can be performed at each cycle, the reading of data from a conventional SRAM generally has a latency of two cycles. Indeed, upon execution of a read instruction, the address is presented to the memory. An additional cycle is required to provide the memory with a read access signal, and a last cycle is required for the memory to present the data over its data bus.

To illustrate the resulting difficulties, a common loop, the function of which is to increment by a constant successive values stored in the memory will be considered hereafter as an example. This loop may directly be written as:

LD: R1=[i]

OP: R1=R1+R2

ST: [i]=R1

BR: test i, i++, loop                (1)

This loop, for clarity, uses a single MEMU unit. It consists of loading (LD) in a register R1 the value stored in the memory at address i, incrementing (OP) the content of register R1 by the value contained in a register R2, storing (ST) at address i the new content of register R1, and finally incrementing and testing address i to resume the loop (BR). The loop will be left when branch unit BRU detects that address i has reached a predetermined value. In a DSP, there are generally no BR-type instructions. The loops are programmed in advance by setting registers provided for this purpose in unit BRU which performs the tests, incrementations and branchings independently.

Register R1 is a work register of the ALU, while address i is stored in a register of branch unit BRU. Operations LD and ST are operations to be performed by one of units MEMU, operation OP is to be performed by unit ALU, and operation BR is to be performed by unit BRU. Operations LD and OP will be provided in parallel to units MEMU and ALU in a same compound instruction, while operations ST and BR will be provided in parallel to units MEMU and BRU in a second compound instruction.

In fact, some compound instructions include fields which are provided to several units at a time. For example, a load instruction LD, meant for a unit MEMU, also includes a field meant for unit ALU to prepare one of its registers (R1) to receive the data which will be presented by the memory. Similarly, a store instruction ST includes a field meant for unit ALU to select a register, the content of which is presented over the memory bus. Thus, as shown in FIG. 1, a field f of each of instructions I2 and I3 provided to units MEMU is provided to the instruction queue 18 of unit ALU in parallel with a normal instruction I1, and unit ALU is able to perform in one cycle a normal instruction and an operation indicated by a field f.

The following table illustrates, for several iterations of the loop, the operations performed by one memory access unit MEMU and by arithmetic unit ALU. The branching instructions BR do not raise any problem and the table does not illustrate them, for clarity.

Each row in the table corresponds to an instruction cycle and each operation marked in the table is assigned with a number corresponding to the loop iteration.

|  | Instruction queues | | Units | |
| --- | --- | --- | --- | --- |
| Cycle | MEMU | ALU | MEMU | ALU |
| 1 | LD1 | OP1 | LD1 | — |
| 2 | ST1 | | — | — |
| | | OP1 | | |
| 3 | LD2 | OP2 | — | OP1 |
| | ST1 | | | |
| | | OP1 | | |
| 4 | ST2 | | ST1 | — |
| | LD2 | OP2 | | |
| | ST1 | | | |
| 5 | LD3 | OP3 | LD2 | — |
| | ST2 | | | |
| | LD2 | OP2 | | |
| 6 | ST3 | | — | — |
| | LD3 | OP3 | | |
| | ST2 | | | |
| | | OP2 | | |
| 7 | LD4 | OP4 | — | OP2 |
| | ST3 | | | |
| | LD3 | OP3 | | |
| | ST2 | | | |
| | | OP2 | | |
| 8 | ST4 | | ST2 | — |
| | LD4 | OP4 | | |
| | ST3 | | | |
| | LD3 | OP3 | | |
| | ST2 | | | |
| 9 | LD5 | OP5 | LD3 | — |
| | ST4 | | | |
| | LD4 | OP4 | | |
| | ST3 | | | |
| | LD3 | OP3 | | |
| 10 | ST5 | | — | — |
| | LD5 | OP5 | | |
| | ST4 | | | |
| | LD4 | OP4 | | |
| | ST3 | | | |
| | | OP3 | | |

-continued

| Cycle | Instruction queues | | Units | |
|---|---|---|---|---|
| | MEMU | ALU | MEMU | ALU |
| 11 | LD6 | OP6 | — | OP3 |
| | ST5 | | | |
| | LD5 | OP5 | | |
| | ST4 | | | |
| | LD4 | OP4 | | |
| | ST3 | | | |
| | | OP3 | | |
| 12 | ST6 | | ST3 | — |
| | LD6 | OP6 | | |
| | ST5 | | | |
| | LD5 | OP5 | | |
| | ST4 | | | |
| | LD4 | OP4 | | |
| | ST3 | | | |

At the first cycle, units MEMU and ALU receive the first instructions LD and OP (LD1, OP1). Unit MEMU immediately executes instruction LD1, which starts the read cycle of the value stored at address i in the memory. Instruction LD1 is deleted from the instruction queue of unit MEMU. Instruction OP1, which needs the value fetched by instruction LD1, cannot be executed yet. This instruction OP1 waits in the instruction queue of unit ALU.

At the second cycle, unit MEMU receives the first instruction ST (ST1). Instruction ST1, which needs the result of operation OP1, cannot be executed yet and waits in the instruction queue of unit MEMU. Instruction OP1 still waits in the queue of unit ALU, since the memory still does not send back the operand that it requires.

At the third cycle, units MEMU and ALU receive instructions LD2 and OP2. These instructions are put in the queues after the still unexecuted instructions ST1 and OP1. The memory finally sends back the operand required by instruction OP1. This instruction OP1 is then executed and deleted from the instruction queue.

At cycle 4, unit MEMU receives instruction ST2. Instruction ST2 is put to wait in the queue of unit MEMU after instruction LD2. Since instruction OP1 was executed at the previous cycle, its result is available. Instruction ST1 can thus be executed and deleted from the queue. Although instruction OP2 is alone in the queue of unit ALU, this instruction cannot be executed yet since it requires an operand which will be fetched by the execution of instruction LD2.

At cycle 5, units MEMU and ALU receive instructions LD3 and OP3. Instruction LD2 is executed and deleted from the queue.

Instruction OP2 must still wait in the queue, since it requires an operand which will be sent back two cycles later by the memory in response to instruction LD2.

From the fifth cycle on, the execution of the instructions of the second iteration of the loop proceeds as for the first iteration starting at cycle 1.

As shown by the table, although the processor is capable of performing one memory access at each cycle, it only performs memory access two cycles out of four, that is, the loop execution efficiency is only 50%.

Further, upon each new iteration of the loop, the instruction queue of unit MEMU fills with additional instructions and ends up overflowing. To avoid the overflow, the provision of instructions must be regularly stopped to enable the queues to empty. This considerably decreases the efficiency.

In fact, the loop programming in its straightforward form is not at all optimal due to the memory latency.

To improve the efficiency, taking account of the memory latency, a so-called loop unrolling technique is often used. This technique consists of programming a macroloop, each iteration of which corresponds to several iterations of the normal loop. Thus, the preceding loop (1) is written, for example, as:

$Lda$: $R1=[i]$ $Opa$: $R1=R1+R2$ $Ldb$: $R3=[i+1]$ $Opb$: $R3=R3+R2$ $Sta$: $[i]=R1$ $Stb$: $[i+1]=R3$ $BR$: test $i$, $i=+2$, loop  (2)

In this loop, the value contained at address i is loaded (LDa) in register R1, the content of register R2 is incremented (OPa) by the content of a register R1, the value contained at address i+1 is loaded (LDb) in a register R3, the content of register R3 is incremented (OPb) by the value contained in register R2, the content of register R1 is stored (STa) at address i, the content of register R3 is stored (STb) at address i+1, and variable i is incremented by 2 to restart the loop.

This loop is programmed in four compound instructions. The first one is formed of operations LDa and OPa, the second one of instructions LDb and OPb, the third one of instruction STa, and the fourth one of instructions STb and BR. The following table illustrates the sequence of operations for several loop iterations.

| Cycle | Instruction queues | | Units | |
|---|---|---|---|---|
| | MEMU | ALU | MEMU | ALU |
| 1 | LDa1 | OPa1 | LDa1 | — |
| 2 | LDb1 | OPb1 | LDb1 | — |
| | | OPa1 | | |
| 3 | STa1 | | — | OPa1 |
| | | OPb1 | | |
| | | OPa1 | | |
| 4 | STb1 | | — | OPb1 |
| | STa1 | | | |
| | | OPb1 | | |
| 5 | LDa2 | OPa2 | STa1 | — |
| | STb1 | | | |
| | STa1 | | | |
| 6 | LDb2 | OPb2 | STb1 | — |
| | LDa2 | OPa2 | | |
| | STb1 | | | |
| 7 | STa2 | | LDa2 | — |
| | LDb2 | OPb2 | | |
| | Lda2 | OPa2 | | |
| 8 | STb2 | | LDb2 | — |
| | STa2 | | | |
| | LDb2 | OPb2 | | |
| | | OPa2 | | |
| 9 | LDa3 | OPa3 | — | OPa2 |
| | STb2 | | | |
| | STa2 | | | |
| | | OPb2 | | |
| | | OPa2 | | |
| 10 | LDb3 | OPb3 | — | OPb2 |
| | LDa3 | OPa3 | | |
| | STb2 | | | |
| | STa2 | | | |
| | | OPb2 | | |

-continued

| | Instruction queues | | Units | |
|---|---|---|---|---|
| Cycle | MEMU | ALU | MEMU | ALU |
| 11 | STa3<br>LDb3<br>LDa3<br>STb2<br>STa2 | OPb3<br>OPa3 | STa2 | — |
| 12 | STb3<br>STa3<br>LDb3<br>LDa3<br>STb2 | OPb3<br>OPa3 | STb2 | — |

At the first cycle, units MEMU and ALU receive the first instructions LDa and OPa (LDa1, OPa1). Instruction LDa1 is immediately executed and deleted from the queue.

At the second cycle, units MEMU and ALU receive instructions LDb1 and OPb1. Instruction LDb1 is immediately executed and deleted from the queue. Instructions OPa1 and OPb1 remain in the queue of unit ALU waiting for the corresponding operands that the memory has to send back in response to instructions LDa1 and LDb1.

At the third cycle, unit MEMU receives instruction STa1. The memory sends back the operand asked for by instruction LDa1 and required by instruction OPa1. Instruction OPa1 can thus be executed and deleted from the queue.

At the fourth cycle, unit MEMU receives instruction STb1. The memory sends back the operand asked for by instruction LDb1 and required by instruction OPb1. Instruction OPb1 can thus be executed.

At the fifth cycle, units MEMU and ALU receive instructions LDa2 and OPa2. Instruction STa1 can be executed since the value that it requires has been calculated by instruction OPa1 two cycles before.

At the sixth cycle, units MEMU and ALU receive instructions LDb2 and OPb2. Instruction STb1 is executed since the value that it requires has been calculated by instruction OPb1 two cycles before.

At the seventh cycle, unit MEMU receives instruction STa2. A new iteration of the loop is started by the execution of instruction LDa2.

The processor appears in this table to perform four memory accesses every six cycles, which amounts to a 66% efficiency and a 33% gain with respect to the preceding solution.

The queue of unit MEMU however appears to progressively fill up, requiring to regularly stop the instruction provision. It fills with two instructions every six cycles instead of with two instructions every four cycles as was the case for the previous solution.

The loop unrolling technique, although substantially improving the efficiency, is not an optimal solution for superscalar processors. In fact, it works much better on scalar processors.

SUMMARY OF THE INVENTION

An object of the present invention is to provide a superscalar processor architecture having a maximum efficiency for the execution of loops including memory access instructions.

This object as well as others is achieved by means of a processor including at least one memory access unit for presenting a read or write address over an address bus of a memory in response to the execution of a read or write instruction; and an arithmetic and logic unit operating in parallel with the memory access unit and arranged at least to present data on the data bus of the memory while the memory access unit presents a write address. The processor includes a write address queue in which is stored each write address provided by the memory access unit waiting for the availability of the data to be written.

According to an embodiment of the present invention, the arithmetic and logic unit includes two independent instruction queues intended for receiving instructions waiting for execution, a first of the instruction queues being intended for receiving logic and arithmetic instructions, and the second instruction queue being intended for receiving instruction fields provided to the memory access unit to identify registers of the arithmetic and logic unit which are involved in read or write operations.

According to an embodiment of the present invention, the arithmetic and logic unit includes a store data queue in which each datum to be written in the memory waits for the presence of a write address in the write address queue.

According to an embodiment of the present invention, the arithmetic and logic unit includes a load data queue in which is written each datum from the memory for the arithmetic and logic unit, waiting for the arithmetic and logic unit to be available.

According to an embodiment of the present invention, the processor includes a branch unit for receiving instructions and distributing them in parallel between itself, the memory access unit and the arithmetic and logic unit.

According to an embodiment of the present invention, each of the units includes a store data queue in which each datum to be written in the memory waits for the presence of a write address in the write address queue.

According to an embodiment of the present invention, each of the units includes a load data queue in which is written each datum from the memory for the unit, waiting for the unit to be available.

The foregoing objects, features and advantages of the present invention will be discussed in detail in the following non-limiting description of specific embodiments in connection with the accompanying drawings.

DETAILED DESCRIPTION

Figure 1:
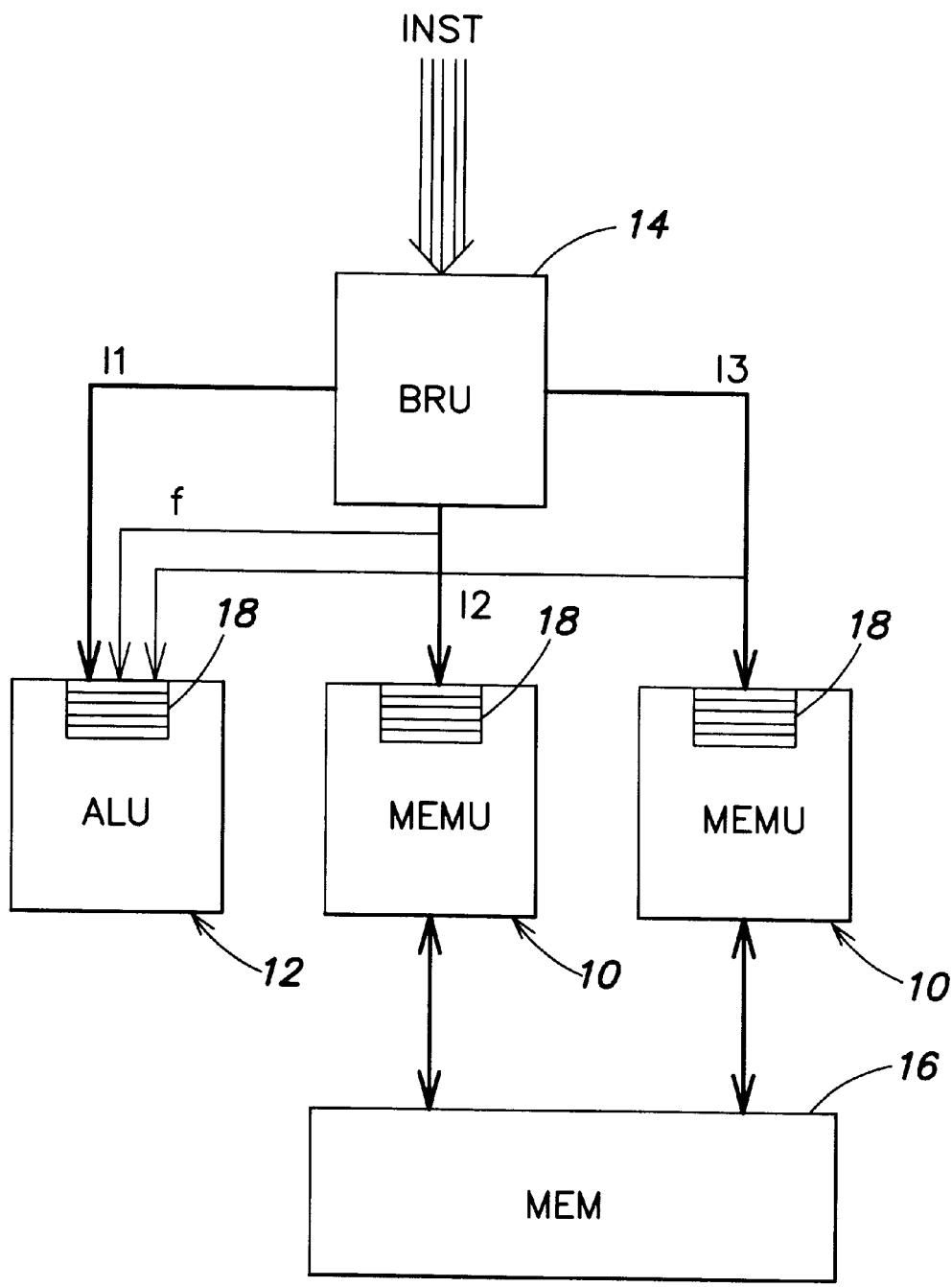
FIG. 1, previously described, shows a conventional DSP architecture.
Figure 2:
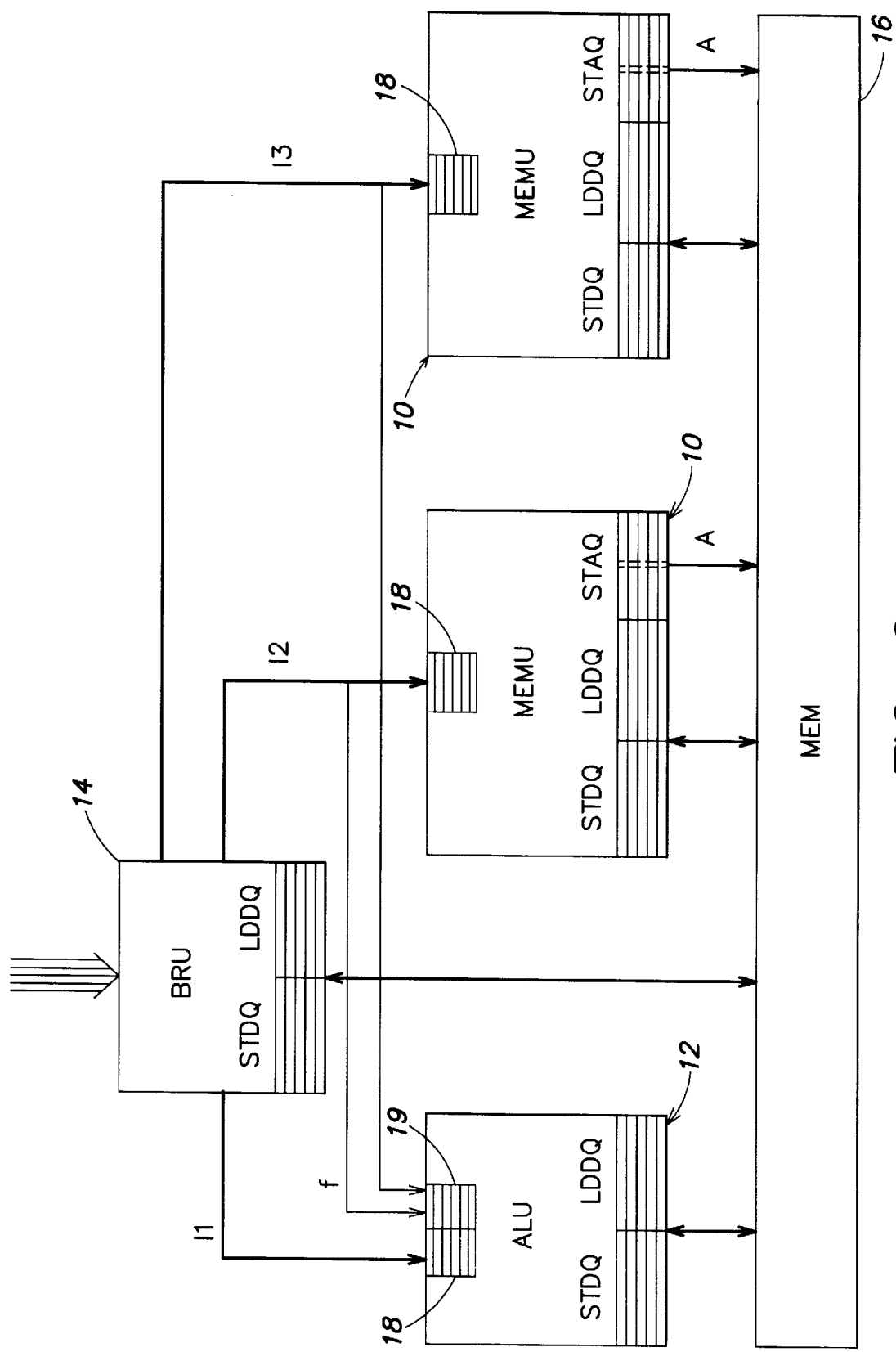
FIG. 2 shows a DSP architecture according to the present invention.

In FIG. 2, a processor according to the present invention includes, as in FIG. 1, two memory access units 10 (MEMU) and one logic and arithmetic unit 12 (ALU), all coupled with a branch unit 14. Units 10 and 12 include instruction queues 18 in which branch unit BRU stacks instructions awaiting execution.

According to the present invention, each memory access unit MEMU includes a store address queue STAQ from which are provided the addresses used for the write accesses to memory 16. The read addresses are conventionally provided to memory 16, as shown by dotted lines across queues STAQ.

Further, unit ALU is provided with a store data queue STDQ and with a load data queue LDDQ through which the data exchanged with the memory transit. In practice, all units in a processor are conventionally likely to exchange data with the memory and thus include, as shown, queues STDQ and LDDQ. Queues STAQ, STDQ, and LDDQ all are of FIFO type.

Each time a unit MEMU executes a store instruction, the write address is stacked in the corresponding queue STAQ. The data to be written by this instruction are stacked in a corresponding store data queue STDQ, generally of unit ALU. For example, if the content of register R1 of unit ALU should be written at address i, the unit MEMU which executes the write instruction stacks address i in its queue STAQ while unit ALU stacks the content of register R1 in its queue STDQ. It should be noted that the data to be written are not necessarily stacked in queue STDQ at the same time as the address is stacked in queue STAQ. This is an essential aspect of the present invention.

At each cycle, the contents of queues STDQ and STAQ are polled. If queue STAQ contains an address and one of queues STDQ contains data, the data is written at the address contained in queue STAQ, then queues STDQ and STAQ are updated. If these conditions are not fulfilled, that is, if queue STAQ is empty, or if queues STDQ are all empty, no writing is performed. The condition where two queues STDQ contain data at the same time never occurs.

In the case of a DSP including two memory access units MEMU, each location of queues STDQ may contain two data words, one for each of units MEMU. Then, for a writing to occur, a data word contained in the location of a queue STDQ must besides correspond to the unit MEMU having a non-empty queue STAQ.

This mechanism enables executing a write instruction immediately, without taking account of the availability of the memory bus or of the data to be written. The data to be written will be written subsequently, as soon as the data and the memory bus are all available. This mechanism is described in more detail hereafter by means of an example.

Consider again the example of loop (1), programmed in its straightforward form:

$LD: R1=[i]$ $OP: R1=R1+R2$ $ST: [i]=R1$ $BR:$ test $i$, $i$++, loop  (1)

As previously indicated, a load instruction LD or store instruction ST is formed of two fields, one for unit MEMU to indicate the read or write address, and the other for unit ALU to indicate the register which should receive the data read or the content of which should be written. Thus, an instruction LD hereabove decomposes in an ALU instruction:

$LDA: R1=LDDQ,$ for loading in register R1 the first element of load queue LDDQ, and a MEMU instruction:

$LDM: R(i),$ for presenting address i in read mode.

An above store instruction ST decomposes in an ALU instruction:

$STA: STDQ=R1,$ for stacking the content of register R1 in store queue STDQ, and a MEMU instruction:

$STM: STAQ=i,$ for stacking write address i in address queue STAQ.

The fields f of the read/write instructions for unit ALU are, according to the present invention, stacked in an instruction queue 19 independent of queue 18 by which the normal instructions I1 for unit ALU (such as instruction OP) are received.

The following table illustrates, for several iterations of loop (1), the operations performed by one of units MEMU and unit ALU, and the contents of the instruction queues of units MEMU and ALU, the contents of queue STAQ of unit MEMU, and finally the contents of queues STDQ and LDDQ of unit ALU. In the table, the operations are assigned with a number corresponding to the iteration.

| | | | | | | Memory queues | | |
|---|---|---|---|---|---|---|---|---|
| | Instruction queues | | | Units | | MEMU | | ALU |
| Cycle | MEMU | ALU | | MEMU | ALU | STAQ | STDQ | LDDQ |
| 1 | LDM1 | LDA1 | OP1 | LDM1 | — | | | |
| 2 | STM1 | STA1 | | STM1 | — | i | | |
| | | LDA1 | OP1 | | | | | |
| 3 | LDM2 | LDA2 | OP2 | LDM2 | LDA1 | i | | [i] |
| | | STA1 | | | OP1 | | | |
| | | LDA1 | OP1 | | | | | |
| 4 | STM2 | STA2 | | STM2 | STA1 | i + 1 | | |
| | | LDA2 | OP2 | | | i | $R1_1$ | |
| | | STA1 | | | | | | |
| 5 | LDM3 | LDA3 | OP3 | LDM3 | LDA2 | i + 1 | | [i + 1] |
| | | STA2 | | | OP2 | | | |
| | | LDA2 | OP2 | | | | | |
| 6 | STM3 | STA3 | | STM3 | STA2 | i + 2 | | |
| | | LDA3 | OP3 | | | i + 1 | $R1_2$ | |
| | | STA2 | | | | | | |
| 7 | LDM4 | LDA4 | OP4 | LDM4 | LDA3 | i + 2 | | [i + 2] |
| | | STA3 | | | OP3 | | | |
| | | LDA3 | OP3 | | | | | |

-continued

| | Instruction queues | | Units | | Memory queues | | |
|---|---|---|---|---|---|---|---|
| | | | | | MEMU | | ALU |
| Cycle | MEMU | ALU | MEMU | ALU | STAQ | STDQ | LDDQ |
| 8 | STM4 | STA4 | STM4 | STA3 | i + 3 | | |
| | | LDA4 | | OP4 | i + 2 | $R1_3$ | |
| | | STA3 | | | | | |

At the first cycle, units MEMU and ALU receive instructions LD1 and OP1, instruction LD1 being decomposed in an instruction LDM1 provided to unit MEMU and an instruction LDA1 provided to unit ALU. Instruction LDM1, directing transmission of a read address, is immediately executed. Instruction LDA1 is set to wait, since it requires a value from read queue LDDQ, which is empty. Instruction OP1, which requires this same value, is also set to wait.

At the second cycle, unit MEMU receives instruction ST1, decomposed in an instruction STM1 provided to unit MEMU and an instruction STA1 provided to unit ALU. Instruction STM1 is executed and causes the stacking in queue STAQ of address i at which the result of operation OP1 will be written. Instruction STA1 is set to wait behind instruction LDA1.

At the third cycle, units MEMU and ALU receive instructions LD2 (LDM2, LDA2) and OP2. The memory provides queue LDDQ with the value [i] required by instruction LDM1. Instruction LDA1 is executed and causes the transfer of value [i] from queue LDDQ to register R1. Instruction OP1 is executed and updates the content of register R1. Unit MEMU being free, instruction LDM2 is also executed.

At the fourth cycle, unit MEMU receives instruction ST2 (STM2, STA2). Instructions STM2 and STA1 are executed. Instruction STA1 causes the copying of the content $R1_1$ of register R1 into queue STDQ. Instruction STM2 causes the stacking in queue STAQ of the address i+1 at which the result of operation OP2 will be written. In the same cycle, queue STAQ is detected to contain an address i and queue STDQ of unit ALU is detected to contain data $R1_1$. Since the memory bus is available, data $R1_1$ are immediately written at address i and queues STAQ and STDQ are updated.

At the fifth cycle, the operations of the third cycle are repeated for a new loop iteration.

The above table illustrates that memory unit MEMU executes an access instruction for each cycle. The efficiency is thus maximum. Further, the instruction queues do not fill up. It is thus not necessary to regularly stop the provision of instructions to avoid queue overflow.

Queues STDQ and LDDQ appear in this example to receive at most one element. These queues could thus be reduced to a mere register, which register is generally provided in a conventional unit to latch the incoming and outgoing data.

In other cases, for more complex loops, queues STDQ and LDDQ may appear to receive more than one element. Then, the number of locations of queues STDQ and LDDQ is increased to avoid any risk of overflow.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A processor including:
    at least one memory access unit for presenting a read or write address over an address bus of a memory in response to the execution of a read or write instruction;
    an arithmetic and logic unit operating in parallel with the memory access unit and arranged at least to present data on the data bus of the memory while the memory access unit presents a write address; and
    a store address queue in which is stored each write address provided by the memory access unit waiting for the availability of the data to be written.

2. The processor of claim 1, wherein the arithmetic and logic unit includes two independent instruction queues intended for receiving instructions waiting for execution, a first of the instruction queues being intended for receiving logic and arithmetic instructions, and the second instruction queue being intended for receiving instruction fields provided to the memory access unit to identify registers of the arithmetic and logic unit which are involved in read or write operations.

3. The processor of claim 1, wherein the arithmetic and logic unit includes a store data queue in which each datum to be written in the memory waits for the presence of a write address in the store address queue.

4. The processor of claim 1, wherein the arithmetic and logic unit includes a load data queue in which is written each datum from the memory for the arithmetic and logic unit, waiting for the arithmetic and logic unit to be available.

5. The processor of claim 1, including a branch unit for receiving instructions and distributing them in parallel between itself, the memory access unit and the arithmetic and logic unit.

6. The processor of claim 5, wherein each of the units includes a store data queue in which each datum to be written in the memory waits for the presence of a write address in the store address queue.

7. The processor of claim 5, wherein each of the units includes a load data queue in which is written each datum from the memory for the unit, waiting for the unit to be available.

8. A computer system executing instructions, said system comprising:
    a memory storing data;
    at least one memory access unit containing at least one store address queue connected to communicate with the memory to present an address from the at least one store address queue to the memory; and
    an arithmetic unit connected to communicate with the memory to present data corresponding to the address to the memory;

further comprising a branch unit for receiving instructions and distributing them in parallel between the branch unit, the at least one memory access unit, and the arithmetic unit.

9. The computer system of claim 8, wherein the arithmetic unit contains at least one store data queue and the arithmetic unit is further connected to present data from the at least one store data queue to the memory.

10. The computer system of claim 8, wherein the at least one memory access unit further contains at least one memory access unit store data queue and the at least one memory access unit is further connected to communicate with the memory to present data from the at least one memory access unit store data queue to the memory.

11. The computer system of claim 8, wherein the arithmetic unit further contains at least one data load queue storing data used by the arithmetic unit in executing the instructions.

12. The computer system of claim 8, wherein the at least one memory access unit further contains at least one memory access unit data load queue storing data used by the arithmetic unit in executing the instructions.

13. The computer system of claim 8, wherein the branch unit contains at least one branch unit store data queue and wherein the data corresponding to the address from the at least one store address queue is supplied from the at least one branch unit store data queue.

14. The computer system of claim 8, wherein the arithmetic unit contains an instruction queue for receiving instruction fields provided to the at least one memory access unit to identify registers of the arithmetic unit which are involved in operations performed by the arithmetic unit.

15. The computer system of claim 8, wherein the computer system is a digital signal processor.

16. A processor including:
   at least one memory access unit taking an instruction as an input and outputting as output an address over an address memory bus;
   an arithmetic and logic unit taking an instruction as an input and outputting as output data over a data memory bus;
   a store address queue storing at least one write address provided by the at least one memory access unit while the data to be written is not available;
   wherein the instruction is a write instruction; and
   wherein the arithmetic and logic unit includes two instruction queues, a first of the instruction queues having an input of logic and arithmetic instructions, and the second instruction queue having an input of instruction fields provided to the memory access unit to identify registers of the arithmetic and logic unit which are involved in write operations.

17. The processor of claim 16, wherein the arithmetic and logic unit includes a store data queue in which each datum to be written in the memory waits for the presence of a write address in the store address queue.

18. A processor including:
   at least one memory access unit taking an instruction as an input and outputting as output an address over an address memory bus;
   an arithmetic and logic unit taking an instruction as an input and outputting as output data over a data memory bus;
   a store address queue storing at least one write address provided by the at least one memory access unit while the data to be written is not available; and
   including a branch unit having instructions as an input and having instructions distributed in parallel to the branch unit, the memory access unit, and the arithmetic and logic unit as an output.

19. The processor of claim 18, wherein each of the units includes a store data queue in which each datum to be written in the memory waits for the presence of a write address in the store address queue.

20. The processor of claim 18, wherein each of the units includes a load data queue in which is written each datum from the memory for the unit, waiting for the unit to be available.

* * * * *